2,488,732
Patented Jan. 6, 1970

3,488,732
HETEROCYCLIC RING COMPOUNDS AND PREPARATION OF SAME
El-Ahmadi I. Heiba, Mercer County, and Ralph M. Dessau, Middlesex County, N.J., assignors to Mobil Oil Corporation, New York, N.Y., a corporation of New York
No Drawing. Filed Feb. 21, 1967, Ser. No. 617,462
Int. Cl. C07d 105/02, 27/08, 63/06
U.S. Cl. 260—343.6         7 Claims

ABSTRACT OF THE DISCLOSURE

A gem-substituted polyhalo hydrocarbon, such as carbon tetrachloride, is reacted with an acetylenically unsaturated compound, such as 1,1-dimethyl-2-propynyl isobutyrate, to form a vinyl radical-containing intermediate which rearranges and cyclizes to form a substituted 5-membered heterocyclic ring product, such as 4-(2,2-dichlorovinyl) - 3,3,5,5-tetramethyl-gamma-butyrolacetone. Besides lactones, products that may be formed include lactams, thiolactones, and phosphacyclopentanone derivatives. They are new compounds, useful as nematocides, having the formula

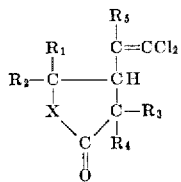

wherein $R_1$, $R_2$, $R_3$ are H, alkyl, cycloalkyl, aralkyl or alkaryl; $R_3$ and $R_4$ are H, alkyl, cycloalkyl, aralkyl, alkaryl, Cl or F, and X is O, N, S or P.

BACKGROUND OF THE INVENTION

The field of the invention comprises 5-membered heterocyclic ring compounds and their preparation.

SUMMARY OF THE INVENTION

The invention relates to vinyl radical-substituted heterocyclic ring compounds, having five members in the ring, formed by reacting a gem-substituted polyhalo hydrocarbon with an acetylenically unsaturated compound. The reaction involves the formation of an intermediate containing a vinyl radical followed by a shift of hydrogen to the vinyl radical and cyclization to form the heterocyclic ring product. The latter may be a substituted gamma lactone, or gamma lactam, or gamma thiolactone, or phosphacyclopentanone derivative. The products are useful as nematocides.

DESCRIPTION OF THE SPECIFIC EMBODIMENTS

In one preferred embodiment, the reaction comprises forming a product compound of the formula

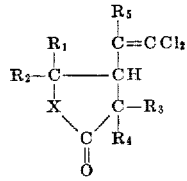

(I)

where $R_1$, $R_2$, and $R_5$ may be the same or different and are selected from H, alkyl, cycloalkyl, aralkyl, and alkaryl; $R_3$ and $R_4$ may be the same or different and are selected from H, alkyl, cycloalkyl, aralkyl, alkaryl, Cl, and F; and X is selected from O, N, S, and P. The products are formed by reacting an acetylenically unsaturated compound of the formula

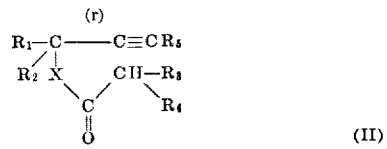

(II)

where the R's and X are the same as in Formula I, with a gem-substituted polyhalo hydrocarbon. The reaction is suitably carried out in the presence of a free-radical-yielding catalyst, and the product is recovered.

The preferred acetylenically unsaturated compounds are defined by Formula II. It will be seen from it that the carbon atom immediately next to the carbonyl group contains at least one abstractable hydrogen atom. It will also be seen that the X-containing moiety, comprising the fragment connected to the carbonyl carbon through X, contains the group,

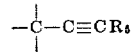

when $R_5$ is H, as is preferred, this group is a 2-propynyl group. Usually at least one of the R groups, and preferably more than one, in Formula II is an alkyl group, and such alkyl group or groups may have any suitable number of carbon atoms, ranging from 1 to 16, 18, or 20 or more carbons. In the case of $R_1$ and $R_2$, when either or both is an alkyl group having a linear chain of 3 or more carbons, it is preferred that there shall not be any H atoms present which are attached to a saturated carbon atom in the gamma position of the chain, considering the alpha carbon of such chain to be that attached to the carbon identified as (r) in Formula II; in other words, the H atom or atoms attached to the said gamma carbon should, preferably, not be readily abstractable. The groups at $R_3$ and $R_4$ are preferably long alkyl groups having at least 8 carbon atoms. For all of the R groups in Formula II, unsaturated alkyl groups are suitable, of the type illustrated by allyl, 3-butenyl, etc., i.e., having the double bond remote from the point of attachment of the group. Also useful, as indicated, are cycloalkyl groups, such as cyclohexyl, cyclopentyl, cyclopropyl, 2-cyclopenten-1-yl, etc. Aralkyl groups preferably include phenalkyl radicals like phenethyl, 3-phenylpropyl, benzyl, benzhydryl, cinnamyl, cuminyl, etc. Alkaryl groups preferably include tolyl, cumyl, xylyl, mesityl, etc.

When X in Formula II is oxygen, as is preferred, the compound is an ester, and the product of Formula I is then a lactone. Following are some illustrative esters:

(1) 1,1-dimethyl-2-propynyl isobutyrate
(2) 1,1-dipropyl-2-propynyl propionate
(3) 1,1-diethyl-2-propynyl acetate
(4) 1-propyl-2-propynyl acetate
(5) 1-butyl-2-propynyl propionate
(6) 1-methyl-2-propynyl ester of phenylpropionic acid
(7) 2-propynyl acetate
(8) 2-propynyl propionate
(9) 2-propynyl isobutyrate
(10) 1,1-diethyl-2-propynyl ester of diethyl acetate
(11) 1,1-diamyl-2-propynyl ester of diethyl acetate
(12) 1-ethyl-1-tolyl-2-propynyl isobutyrate
(13) 1,1-didecyl-2-propynyl ester of 2-decyldodecanoic acid
(14) 1,1-dimethyl-2-butynyl ester of 2,3-dimethyl butanoic acid
(15) 2-butynyl ester of dicetylacetic acid
(16) 2-pentynyl ester of oleic acid
(17) 1-propyl-2-propynyl ester of 3-chloropropanoic acid.

A suitable source of the esters comprises forming them by reacting a 2-alkynyl alcohol, such as 2-propynyl alcohol,

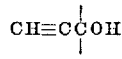

(or 2-butynyl alcohol, 2-pentynyl alcohol, etc.), with an acid chloride,

where the dangling valences may be taken up by various groups as represented by $R_1$, $R_2$, $R_3$, $R_4$ and $R_5$ of Formula II above. Illustrative alcohols and acid chlorides include dimethyl ethynyl carbinol, diethyl ethynyl carbinol, diphenyl ethynyl carbinol, etc., and acetyl chloride, propionyl chloride, isopropionyl bromide, phenyl acetyl chloride, alpha-chloropropionyl chloride, etc.

When X in Formula II is nitrogen, the starting compound may be illustrated by the following: N-(3-methyl-3 - butynyl)-acetamide, N-(3-methyl-3-butynyl)-propionamide, N-(3-methyl-3-butynyl)-phenylacetamide, N-(3-3-diphenyl - 3 - propynyl)-acetamide, N - (3,3-diphenyl-3-propynyl)-propionamide, N - (3,3-diphenyl-3-propynyl)-phenylacetamide, N-(3-methyl-3-pentynyl)-propionamide, N-(3-methyl-3-pentynyl)-acetamide, and the like. With the foregoing, the product compound of Formula I is a lactam.

When X in Formula II is sulfur, the starting compound may be illustrated by 1,1-dimethyl-2-propynyl thioisobutyrate, 1-propyl-2-propynyl thioacetate, 2-propynyl thiopropionate, 2-butynyl thioester of dicetylacetic acid, 1-ethyl-1-tolyl-2-propynyl thio-isobutyrate, and the like. The product compound of Formula I is a thiolactone.

When X in Formula II is phosphorus, the starting compound may be illustrated by acetyl-methyl-3-(3,3-dimethylpropynyl)-phosphine, propionyl - 3-(3,3-dimethylpropynyl)-phosphine, propionyl-3-(3,3-diethylpropynyl)-phosphine, phenylacetyl - 3-(3,3-diethylpropynyl)-phosphine, isobutyryl - 3 - (3,3 - diethylpropynyl)-phosphine, and the like. The product compound of Formula I is a phosphacyclopentanone derivative.

The gem-substituted polyhalo hydrocarbon may be defined by the formula

where Hal is Cl, Br, or I, and R' and R" may be the same or different and are selected from H, alkyl, and aryl. It will be understood that terms like alkyl and aryl, both here and above, include substituted alkyl and substituted aryl, etc. As will be apparent, Formula III includes haloforms and tetrahalides. Particularly suitable are carbon tetrachloride and chloroform; also carbon tetrabromide, bromoform, and iodoform; some of these are normally solid and require to be dissolved in a solvent. Other agents include carbon tetraiodide, methyl chloroform, 1,1-dichlorethane, dichlorodifluoromethane, chlorodifluoromethane, dichlorofluormethane, etc. The last three are normally gaseous and may be used in solution in a suitable solvent. A preferred group of agents comprises chlorinated derivatives of C1 and C2 hydrocarbons having at least 3 atoms of chlorine.

Free radical-yielding catalysts that may be employed include, among others, benzoyl peroxide, hydrogen peroxide, potassium persulphate, cyclohexyl methyl peroxide, diacetyl peroxide, tert-butyl hydroperoxide, di-tert-butyl peroxide, acetyl benzoyl peroxide, cumene hydroperoxide, tert-butyl peracetate, tert-butyl perbenzoate, and the like. They are employed in small amounts ranging from about 0.001 to 5 g., preferably 0.01 to 2 g., per mole of ester.

It is also feassible to carry out the reaction photochemically, instead of using a catalyst, or to apply high energy radiation such as gamma rays, X-rays, beta particles, etc.

A solvent is desirable to bring the reactants and catalyst in good contact and to maintain such contact. As the halogenated hydrocarbon reactant, such as carbon tetrachloride or chloroform, is generally a good solvent, it may be added in an excess amount sufficient to dissolve the acetylenically unsaturated compound and catalyst. Other suitable solvents include benzene, chlorobenzene, acetonitrile, and the like.

The reaction is preferably carried out under refluxing conditions and at ambient pressures, although temperatures may range up to about 200° C. or more and pressures up to any suitable upper limit. Pressures may also be subatmospheric. Equimolar concentrations of the starting compound and of the halogenated hydrocarbon are preferred, except that when the latter also serves as solvent, an excess is used. Preferably a solvent is used, and the reactants are present in small amounts so that the resulting solution is a dilute one, i.e., contains up to about 50% by weight of halogenated hydrocarbon, and of course a corresponding amount of starting compound. Reaction times may vary from 0.5 to 25 hours, preferably from 1 to 10 hours. It is advisable to employ an inert atmosphere, as of nitrogen, helium, or the like, over the reaction mixture to prevent oxidation by air.

Yields of heterocyclic product are generally at least 10 or 20% by weight, based on the acetylenically unsaturated compound converted. Often the yields are higher, going up to 80% or more. The yields tend to vary with the character of the abstractable hydrogen, i.e., the hydrogen on the carbon next to the carbonyl carbon in Formula II. Yields tend to increase in the following order of abstractable hydrogen: tertiary>secondary>primary. In other words, if the hydrogen is tertiary, yield of product tends to be larger than when the hydrogen is secondary, etc. Benzylic hydrogen is on a par with tertiary hydrogen.

It is also found that if the starting acetylenic compound possesses optical activity, at least a portion of such activity is retained by the heterocyclic product.

The product may be recovered in any suitable way, as by filtration, or distillation under reduced pressure, or by extraction with a solvent, etc. For example, for the extraction of lactones, warm aqueous or alcoholic caustic soda or caustic potash solutions are useful as they dissolve the lactone; upon acidification of the resulting mixture with dilute HCl or $H_2SO_4$ or other acid, the product precipitates out. It may be filtered or extracted, depending on whether it is solid or liquid, then washed and recovered.

The reaction may be illustrated by the following equations showing the preparation of a lactone from an acetylenic ester:

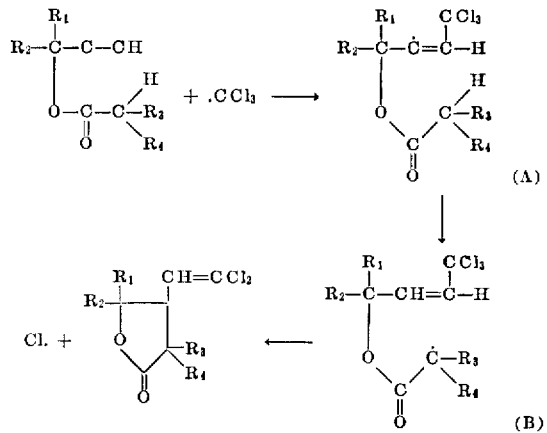

It will be seen that the vinyl radical-containing intermediate (A) rearranges to the intermediate (B) by abstraction of a hydrogen atom from the carbon next to the carbonyl group; the intermediate (B) undergoes further rearrangement and cyclization to yield the heterocyclic ring product.

While the reaction is preferably carried out with a starting acetylenically unsaturated compound in which X (note Formula II) is oxygen, X may also be nitrogen, sulfur, or phosphorus, as indicated. Also, the carbonyl group may be replaced by

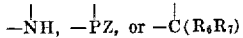

where Z may be an alkyl, aryl, or ester group, and where $R_6$ and $R_7$ may be the same or different and are selected from H, alkyl, or aryl. These variations of X, and the replacements for the carbonyl group, do not affect the principles of the reactions set forth above, nor does the use of other halogenated hydrocarbons within the formula $(Hal)_2CR'R''$, note Formula III. The starting compound may thus be defined as

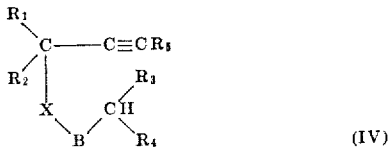

and the resulting product as

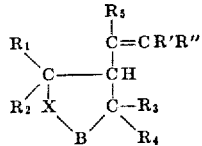

where $R_1$, $R_2$, and $R_5$ may be the same or different and are selected from H, alkyl, cycloalkyl, aralkyl, and alkaryl; $R_3$ and $R_4$ may be the same or different and are selected from H, alkyl, cycloalkyl, aralkyl, alkaryl, Cl, and F; R' and R'' may be the same or different and are selected from H, Cl, Br, I, alkyl, and aryl; X is selected from O, N, S, and P; and B is a group from

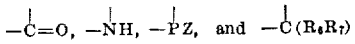

where Z is alkyl, aryl, or an ester group and where $R_6$ and $R_7$ may be H, alkyl, or aryl.

The invention may be illustrated by the following examples.

EXAMPLE 1

About 0.2 mole of 1,1-dimethyl-2-propynyl isobutyrate was dissolved in about half a liter of carbon tetrachloride, 1 g. benzoyl peroxide was added, and the mixture refluxed under a nitrogen atmosphere until most of the peroxide was consumed. The reaction mixture was then distilled under reduced pressure, there being recovered about 0.05 mole of a compound boiling at 115–117° C. at 0.1 mm. On cooling, it solidified, M.P. 56° C. The compound was 4 - (2,2 - dichlorovinyl)-3,3,5,5-tetramethyl-gamma-butyrolactone, having the following structure:

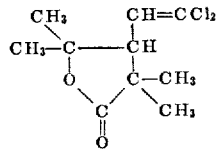

EXAMPLE 2

The preparation of Example 1 was repeated, except that chloroform was used in place of carbon tetrachloride, resulting in the formation and isolation of the same lactone.

EXAMPLE 3

A mixture of about 0.2 mole of 1,1-dimethyl-2-propynyl propionate, about 500 ml. of carbon tetrachloride, and 1 g. benzoyl peroxide was reacted as in Example 1. Distillation of the reaction mixture under reduced pressure yielded about 0.04 mole of a compound, B.P. 92–95° C. at 1 mm., which crystallized to a solid, M.P. 74° C. It was 4 - (2,2 - dichlorovinyl) - 3 - methyl - 5,5 - dimethyl-gamma-butyrolactone, having the following structure:

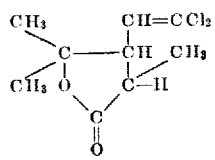

EXAMPLE 4

The experiment of Example 3 was repeated, using chloroform instead of carbon tetrachloride, and resulted in formation and isolation of the same product.

EXAMPLE 5

Using the technique described, 1,1-dimethyl-2-propynyl-2-methylbutanoate, an optically active compound, was reacted with carbon tetrachloride in the presence of benzoyl peroxide to give 4-(2,2-dichlorovinyl)-3-methyl-3-ethyl - 5,5 - dimethyl - gamma - butyrolactone. The latter, which consisted of cis and trans isomers, was isolated by vacuum distillation, B.P. of fraction 80–100° C. at 0.4 mm. The reaction may be indicated briefly:

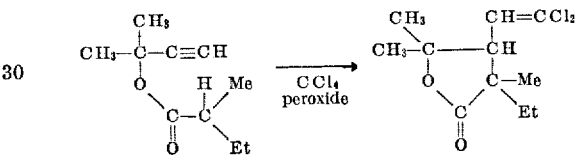

The starting ester had an optical rotation, $[\alpha]_D^{25}$, of +20.6° (EtOH), while that of the product was +0.90°; the latter value did not change on further purification; nor did it change when the product was dissolved in aqueous KOH, acidified, and collected by VPC. Also, the rotation remained substantially the same whether the reaction was carried out at 60° C. or 100° C.

EXAMPLE 6

In order to demonstrate utility as a nematocide, 1-phenyl - 2 - (2',2' - dichlorovinyl) - 3,3 - dimethyl-gamma-butyrolactone, prepared by reacting carbon tetrachloride with 1,1-dimethyl-2-propynyl phenyl acetate, was tested in the laboratory as follows: The heterocyclic compound was applied over land known to contain Root-Knot nematodes. The amount of compound corresponded to 10 lbs. per acre. It effected a kill of 80 to 100%.

As illustrated by Example 5, the preparative method is of significance as showing that reaction at an optically active center can proceed with retention of some optical activity in the product.

In the light of the foregoing description, the following is claimed:

1. A compound of the formula

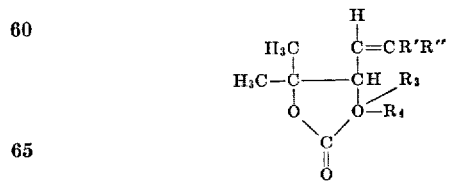

wherein $R_3$ and $R_4$ may be the same or different and are selected from the group consisting of H, methyl, ethyl, and phenyl; and R' and R'' may be the same or different and are selected from the group consisting of H, Cl, Br, and I.

2. Compound of claim 1 where R' and R'' are Cl.

3. Method of forming a compound of the formula set forth in claim 1, wherein $R_3$, $R_4$, R' and R'' are as defined in claim 1, which comprises reacting an acetylenically unsaturated compound of the formula

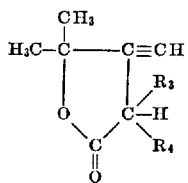

with a polyhalo hydrocarbon selected from the group consisting of chloroform and carbon tetrachloride, carrying out said reaction in the presence of an organic peroxide catalyst, and recovering said product compound.

4. Method of claim 3 wherein said polyhalo hydrocarbon is carbon tetrachloride.

5. Method of claim 3 wherein said polyhalo hydrocarbon is chloroform.

6. Method of claim 3 wherein said reaction is carried out at refluxing temperature.

7. Method of claim 3 wherein said acetylenically unsaturated compound is optically active, and wherein a portion of said optical activity is retained in said product compound.

References Cited

UNITED STATES PATENTS 3,210,377  10/1965  Machleidt _____ 260—343.6

ALEX MAZEL, Primary Examiner

ANNE MARIE T. TIGHE, Assistant Examiner

U.S. Cl. X.R.

260—326.5, 332.3, 332.5, 405.5, 410.9, 310, 487, 455, 558, 561, 606.5, 927; 424—209, 273, 274, 275, 279

UNITED STATES PATENT OFFICE
CERTIFICATE OF CORRECTION

Patent No. 3,488,732  Dated January 6, 1970

Inventor(s) El-Ahmadi I. Heiba and Ralph M. Dessau

It is certified that error appears in the above-identified patent and that said Letters Patent are hereby corrected as shown below:

Column 1, line 20, "butyrolacetone" should be read --butyrolactone--.
Column 3, line 58, "dichlorethane" should be read --dichloroethane--.
Column 4, line 55, in structural formula (A), at left of said line, " $R_2-\overset{R_1}{\underset{|}{C}}-C-CH$ " should be read -- $R_2-\overset{R_1}{\underset{|}{C}}-C\equiv CH$ -- .

SIGNED AND
SEALED

JUN 30 1970

(SEAL)
Attest:

Edward M. Fletcher, Jr.
Attesting Officer

WILLIAM E. SCHUYLER, JR.
Commissioner of Patents